US010570881B2

(12) United States Patent
Egedal et al.

(10) Patent No.: US 10,570,881 B2
(45) Date of Patent: Feb. 25, 2020

(54) CONTROLLING ROTATIONAL SPEED BY CHANGING BLADE PROFILE

(71) Applicant: Siemens Gamesa Renewable Energy A/S, Brande (DK)

(72) Inventors: Per Egedal, Herning (DK); Peder Bay Enevoldsen, Vejle (DK); Claus Vad, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 15/683,802

(22) Filed: Aug. 23, 2017

(65) Prior Publication Data
US 2018/0058424 A1    Mar. 1, 2018

(30) Foreign Application Priority Data

Aug. 30, 2016  (EP) ..................................... 16186403

(51) Int. Cl.
*F03D 7/02* (2006.01)
*F03D 1/06* (2006.01)
(Continued)

(52) U.S. Cl.
CPC ......... *F03D 7/0232* (2013.01); *F03D 1/0675* (2013.01); *F03D 3/062* (2013.01);
(Continued)

(58) Field of Classification Search
CPC ....... B63B 35/73; B63B 39/061; B63B 9/001; F03D 7/0232; F03D 1/0675; F03D 3/062;
(Continued)

(56) References Cited

U.S. PATENT DOCUMENTS

| 4,160,170 A * | 7/1979 | Harner ................. F03D 7/0224 290/44 |
| 6,465,902 B1 * | 10/2002 | Beauchamp ............ F01D 5/148 244/215 |

(Continued)

FOREIGN PATENT DOCUMENTS

| CN | 101338727 A | 1/2009 |
| CN | 102312771 A | 1/2012 |

(Continued)

OTHER PUBLICATIONS

Yao, Wu-Sang. "Modeling and Synchronous Control of Dual Mechanically Coupled Linear Servo System" in Journal of Dynamic Systems, Measurement, and Control, Apr. 2015, vol. 137 [Retrieved online May 29, 2018] Retrieved from: http://asmedigitalcollection.asme.org.*

(Continued)

*Primary Examiner* — Robert E Fennema
*Assistant Examiner* — Jonathan Michael Skrzycki
(74) *Attorney, Agent, or Firm* — Schmeiser, Olsen & Watts LLP

(57) ABSTRACT

Provided is a method of controlling a rotational speed of a rotor of a wind turbine having a rotor with blades connected thereon, at least one blade including a blade profile changing equipment, the method including: changing the blade profile dependent on a rotational speed deviation of an actual rotational speed of the rotor or the generator rotor from a reference rotational speed.

11 Claims, 5 Drawing Sheets

(51) Int. Cl.
*F03D 3/06* (2006.01)
*F03D 7/04* (2006.01)

(52) U.S. Cl.
CPC ......... *F03D 7/0224* (2013.01); *F03D 7/0228* (2013.01); *F03D 7/0276* (2013.01); *F03D 7/042* (2013.01); *F05B 2240/311* (2013.01); *F05B 2270/604* (2013.01); *F05B 2270/605* (2013.01)

(58) Field of Classification Search
CPC ...... F03D 7/022; F03D 7/0224; F03D 7/0276; F03D 7/042; F03D 7/043; F03D 7/046; F03D 80/30; F03D 80/40; F03D 9/005; F03D 9/25; F03D 9/255; F03D 7/04; F03D 7/0296; F05B 2240/122; F05B 2240/30; F05B 2270/604; F05B 2270/605; B64D 47/08; B64D 27/10; B64D 45/00; B64D 2027/026; B64D 2045/0085; B64D 2221/00; B64D 27/24; B64D 31/12

See application file for complete search history.

(56) References Cited

U.S. PATENT DOCUMENTS

| | | | | |
|---|---|---|---|---|
| 8,192,161 B2* | 6/2012 | Baker | ............... | F03D 1/0641 416/23 |
| 8,303,249 B2 | 11/2012 | Haans | | |
| 9,689,374 B2* | 6/2017 | Dixon | ............... | F03D 7/0224 |
| 2003/0091436 A1 | 5/2003 | Stiesdal | | |
| 2008/0292461 A1* | 11/2008 | Stiesdal | ............... | F03D 7/0232 416/147 |
| 2009/0028705 A1 | 1/2009 | Meldgaard et al. | | |
| 2011/0103952 A1 | 5/2011 | Pesetsky | | |
| 2011/0142595 A1 | 6/2011 | Santiago et al. | | |
| 2013/0280067 A1* | 10/2013 | Goodman | ............. | F03D 7/0224 416/1 |
| 2014/0271191 A1 | 9/2014 | Brooks et al. | | |
| 2016/0076517 A1* | 3/2016 | Butterworth | .......... | F03D 7/0232 416/1 |
| 2016/0115941 A1* | 4/2016 | Marwaha | ............... | F03D 7/046 416/1 |
| 2018/0171975 A1* | 6/2018 | Rohm | ................... | F03D 7/0232 |

FOREIGN PATENT DOCUMENTS

| | | |
|---|---|---|
| CN | 102705154 A | 10/2012 |
| EP | 2633189 A2 | 9/2013 |
| EP | 2995811 A1 | 3/2016 |

OTHER PUBLICATIONS

Plumley C.E. et al: Supplementing wind turbine pitch control with a trailing edge flap smart rotor, 3rd Renewable Power Generation Conference ( RPG 2014). pp. 8.34-8.34, XP055343775, DOI: 10.1049/cp.2014.0919 ISBN: 978-1-84919-917-9, the whole document; 2014.

European Extended Search Report dated Feb. 16, 2017, Application No. 16186403.8; 8 pgs.

\* cited by examiner

CONTROLLING ROTATIONAL SPEED BY CHANGING BLADE PROFILE

CROSS-REFERENCE TO RELATED APPLICATION

This application claims priority to European application No. 16186403.8 having a filing date of Aug. 30, 2016, the entire contents of which are hereby incorporated by reference.

FIELD OF TECHNOLOGY

The following relates to a method and an arrangement for controlling a rotational speed of a rotor of a wind turbine having a rotor with blades connected thereon, at least one blade including a blade profile changing equipment.

BACKGROUND

US 2003/0091436 A1 discloses a method for regulating a windmill and an apparatus for the use of said method, wherein a device for regulating the airflow around a blade of a windmill comprises a spoiler which is provided with a cavity. The spoiler is mounted to a surface of the blade and can change the airflow around the blade by assuming different forms. When the spoiler is in an activated form, the airflow is changed in that the spoiler no longer follows the contours of the blade and creates a discontinuity or at least changes the profile of the blade in such way that the airflow conditions are changed. It is possible to regulate the speed of rotation of the rotor on which the blade is mounted.

Conventionally, a wind turbine rotor speed may be controlled using a pitch system. The pitch system may rotate the entire turbine blade in order to keep the power output close to constant, in particular for wind speeds above rated wind speed. The effect of the blade rotation may be a change in the angle of attack (of the wind) and thus a change of lift of the blade and ultimately the torque of the rotor.

In the conventionally known methods and systems, controlling the speed of a wind turbine rotor may be difficult and problematic.

Thus, there may be a need for a method and an arrangement for controlling a rotational speed of a rotor of a wind turbine which is reliable, safe, which reduces wear of components of the wind turbine and which is in particular applicable at wind speeds above rated wind speeds.

SUMMARY

An aspect relates to a method of controlling a rotational speed of a rotor of a wind turbine having a rotor with blades connected thereon, at least one blade including a blade profile changing equipment, the method comprising changing the blade profile dependent on a rotational speed deviation of an actual rotational speed of the rotor or the generator from a reference rotational speed.

The wind turbine for which the method and the arrangement according to embodiments of the present invention may be applied may comprise a wind turbine tower, a nacelle mounted on top of the tower, wherein the nacelle supports a rotor at which plural blades are connected. The rotor may be mechanically connected to a generator, in particular permanent magnet synchronous generator which, upon rotation of the rotor generates an AC output power. The wind turbine may further comprise a converter, in particular an AC-DC/DC-AC converter which converts a variable frequency AC power stream to a fixed frequency AC power stream which may optionally be transformed to a higher voltage using a wind turbine transformer. The wind turbine which may comprise the arrangement for controlling the rotational speed according to embodiments of the present invention may be one wind turbine of a plurality of wind turbines forming a wind park. The wind turbine may or may not comprise a gear system arranged between the wind turbine rotor and the generator rotor.

The method may be carried out by a module or a section or a portion of a wind turbine controller which may for example comprise one or more input ports and one or more output ports via which control signals may be supplied to one or more actuators to achieve changing the blade profile.

The method may in particular be applied when the wind speed is above the rated wind speed. The rated wind speed may be the wind speed for which the wind turbine is designed to (continuously) operate under normal conditions. When the wind speed is above the rated wind speed, additional control measures may be necessary in order to in particular keep the rotational speed of the rotor constant, in particular below or at a threshold or reference, in order to reduce or even avoid damage or wear of wind turbine components, such as a bearing, the generator and other components and also to reduce or even avoid overheating of components of the wind turbine. In particular, when the wind speed is above the rated wind speed, a lifting effect or coefficient of the blades may be required to be reduced, in order to keep the rotational speed below or at least substantially below the rotational speed threshold or reference.

The method may in particular involve changing the blade profile when there are relatively small changes in wind speeds, such as wind gusts, when however the average wind speed (such as averaged over 1 s, or between 1 s and 10 s or between 1 s and 30 s) is substantially constant.

The blade profile changing equipment may be arranged or designed in a number of different manners. For example, the blade profile changing equipment may comprise a spoiler and/or a flap mounted on one or more surfaces, such as the suction surface (and/or the pressure surface) of the blade. The blade profile changing equipment may be adapted to change the aerodynamic profile of at least a portion of an outer blade surface, in particular a portion of the suction surface of the blade.

Since in particular, the rotor (at which the blades are mounted) and the generator rotor are mechanically connected (optionally via a gearbox), the rotational speed of the rotor may be derivable from the rotational speed of the generator rotor and vice versa. In particular, the method may only require determining (in particular measure) either the actual rotational speed of the rotor or the actual rotational speed of the generator rotor.

The reference rotational speed may be also referred to as rated rotational speed, in particular meaning a rotational speed under normal operating conditions of the wind turbine for which rotational speed of the wind turbine and its components are designed for.

The method may be adapted and effective for substantially holding constant the rotational speed of the rotor or the generator at the reference rotational speed. Thereby, the wind turbine may be operated in a reliable and safe manner, even for wind speeds above rated wind speed. When the wind speed changes rapidly or slowly but to a relatively small extent around an average wind speed, it may be sufficient to regulate the blade profile using the blade profile changing equipment without regulating or changing the blade pitch angle. Thereby, wear of the blade pitch angle adjustment system may be reduced, possibly prolonging the lifetime of blade components, such as a bearing or a blade angle adjustment actuating system. By changing the blade profile, the blade lift and/or the rotor torque may be changed, thereby enabling to control the rotational speed of the rotor or the generator rotor.

According to an embodiment of the present invention, changing the blade profile comprises deriving, in particular using a blade profile controller, a blade profile reference based on the rotational speed deviation, and adjusting the blade profile, in particular using an actuator, based on the blade profile reference.

The blade profile reference may be represented by a blade profile reference signal, such as an optical and/or electrical signal. The blade profile reference may define a shape of the blade profile changing equipment or may for example define a relative orientation of at least two portions of the blade profile changing equipment, the orientations defining a shape of the blade profile changing equipment. The orientations may for example be characterized by one or more relative angles of portions of the blade profile changing equipment.

The blade profile controller may receive the rotational speed deviation as an input signal and may comprise a PI or PID controller characterized by controller parameters. The actuator may for example comprise an electric actuator, such as an electric motor, and/or a hydraulic system, or a compressor system which may inflate or deflate a hose or a cavity, thereby changing the outer shape or surface of a blade profile changing equipment. The blade profile reference may be derived by the controller such that the rotational speed deviation decreases, in particular to zero, when the blade profile changing equipment is actually adjusted based on the blade profile reference.

According to an embodiment of the present invention, the method further comprises determining, in particular measuring, a setting of the blade profile changing equipment, deriving a blade profile deviation of the blade profile reference from the determined setting of the blade profile changing equipment, supplying a pitch controller input signal to a pitch controller, wherein the pitch controller input signal is based at least on the blade profile deviation, deriving, using the pitch controller, a pitch reference based on the pitch controller input signal, and adjusting a pitch position of the blade based on the pitch reference.

When there are only small wind speed changes relative to an average wind speed, changing the blade profile using the blade profile changing equipment may be sufficient to control the rotational speed of the rotor to be substantially constant. However, when the (e.g. averaged over 1 s to 30 s) wind speed changes beyond a particular degree, controlling the rotational speed of the rotor using only the blade profile changing equipment may not be possible any more. In particular, in this case (or in other cases or conditions), there may be derived a non-zero blade profile deviation of the blade profile reference from the determined setting of the blade profile changing equipment. This blade profile deviation may be supplied to the pitch controller as an input signal.

In other embodiments, further signals may be added to the blade profile deviation in order to obtain the pitch controller input signal. In the present embodiment, the pitch controller does not obtain a signal representing a rotational speed deviation, but receives as input merely the blade profile deviation (in other embodiments other signals may be added). The pitch controller may derive the pitch reference. The pitch position of the blade may be adjusted (in particular using an actuator of a pitch adjustment system) based on the pitch reference, in particular such that the pitch position equals or at least substantially equals the angle represented by the pitch reference. Thereby, the method may further be improved.

According to an embodiment of the present invention, the pitch controller input signal is obtained by low pass filtering of the blade profile deviation.

By low pass filtering of the blade profile deviation, fast changes of the blade profile deviation (i.e. very rapid changes of the blade profile deviation) are filtered out (i.e. damped or reduced in magnitude) such that only slow changes of the blade profile deviation remain. The time constants of the low pass filtering and/or frequency thresholds may be selected or determined based on the particular application and configuration of the blade profile changing equipment and/or the entire wind turbine.

According to an embodiment of the present invention, the method further comprises low pass filtering the determined setting of the blade profile changing equipment, adding the low pass filtered determined setting of the blade profile changing equipment to the, in particular low pass filtered, blade profile deviation to obtain the pitch controller input signal.

The setting of the blade profile changing equipment may in particular be represented relative to a neutral setting of the blade profile changing equipment which may represent a minimal (or substantially zero) effect of the blade profile changing equipment on the blade profile, in particular the aerodynamic blade profile. When the setting of the blade profile changing equipment deviates to a high degree from the neutral setting of the blade profile changing equipment, the opportunities to control the blade profile changing equipment may be restricted more and more the higher the deviation from the neutral setting of the blade profile changing equipment is. If this happens, it is advantageous to adjust the pitch of the blade. Therefore, it is advantageous to add the low pass filtered determined setting of the blade profile (in particular represented as a deviation of the setting relative to a neutral setting) to the blade profile deviation to obtain the pitch controller input signal. In particular, when the setting of the blade profile changing equipment corresponds to the neutral setting of the blade profile changing equipment, nothing may be added to the blade profile deviation to obtain the pitch controller input signal. However, if the difference between the setting of the blade profile changing equipment and the neutral setting of the blade profile changing equipment is non-zero, this difference may be added to the blade profile deviation to obtain the pitch controller input signal.

Thereby, the method may primarily try to regulate the rotational speed by changing the blade profile using the blade profile changing equipment. Whenever the blade profile changing equipment approaches its limits for further change of the blade profile, additionally the blade pitch may be adjusted which may (in turn) allow to readjust the setting of the blade profile changing equipment more towards the neutral position or neutral setting of the blade profile changing equipment.

Thus, the method may provide a two-stage control, primarily using the blade profile changing equipment and secondarily using the pitch system for controlling the rotational speed of the rotor of the wind turbine.

Thereby, components of the wind turbine may be preserved and their lifetime may be prolonged.

According to an embodiment of the present invention, the method further comprises deriving a rotational speed deviation rate as a time change, in particular time derivative, of the rotational speed deviation, determining a rate excess of the rotational speed deviation rate over a rate threshold, adding a low pass filtered determined setting of the blade profile changing equipment, to the, in particular low pass filtered, blade profile deviation and to the rate excess to obtain the pitch controller input signal.

The rotational speed deviation rate may for example be obtained using a feedforward filter. If the rotational speed deviation rate is larger than the rate threshold, the rate excess may be added to the low pass filtered determined setting of the blade profile changing equipment and to the low pass filtered blade profile deviation to obtain the pitch controller input signal. This feature of the method addresses the situation, where there is a rapid and significantly large temporal change of the rotational speed deviation which presumably cannot be handled by controlling the blade profile changing equipment alone. In this situation, not only the blade profile changing equipment reacts, but also the blade pitch angle may be changed. Thereby, the method also provides to control the rotational speed of the rotor by a combination of changing the blade profile using the blade profile changing equipment and also (in particular simultaneously) changing the pitch angle of the blade (in particular one or more blades) for effectively responding to the detected speed deviation and rotational speed deviation rate. Thereby, the method may further be improved.

According to an embodiment of the present invention, the blade profile changing equipment is mounted at the blade such as to enable to change at least a portion of a surface shape at a suction side of the blade.

The blade profile changing equipment may be adapted to change or adapt or alter at least a portion of a shape of an aerodynamic surface at the suction side (opposite to the pressure side facing the wind) of the blade. Thereby, the aerodynamic lift and/or torque the wind causes on the blade may be adjusted.

According to an embodiment of the present invention, the blade profile changing equipment comprises an adjustable spoiler, in particular mounted on a suction surface of the blade, the spoiler in particular being adjustable by supplying a fluid into or withdrawing a fluid out of a cavity or hose thereby adjusting an extent of protrusion of the spoiler from the surrounding suction surface of the blade.

The spoiler may have any size and shape, such as a convex shape, a concave shape or a combination thereof and may extend over a portion or the entire blade in a particular region of the suction side. The shape of the spoiler may be changeable or the shape of the spoiler may not be changeable. The spoiler orientation or localization relative to the rest of the blade may be changeable. The spoiler relative orientation may for example be adjustable using an electric actuator which turns or moves (a portion of) the spoiler relative to the blade.

An extent of the protrusion (or a degree of inflation or a pressure inside the cavity) of the spoiler may for example represent the setting of the blade profile changing equipment. In other embodiments, a pressure inside a hose or a cavity may represent the setting of the blade profile changing equipment. In still other embodiments, an orientation, for example represented by one or more angles, of one or more portions of the spoiler relative to other portions of the spoiler and/or relative to the rest of the blade may represent the setting of the blade profile changing equipment.

According to an embodiment of the present invention, the blade profile changing equipment comprises a flap mounted at the blade, in particular at a rear edge of the blade, the flap extending and/or defining a rear end portion of a suction side surface.

A flap may comprise a body or comprises one or more physical structures which, due to their shape and/or relative orientation, enable to adjust the blade profile. The flap may be adjustable with respect to its relative orientation (relative to the rest of the blade) and/or with respect to its localization relative to the rest of the blade.

According to an embodiment of the present invention, the flap comprises at least a first and a second portion which are movable, in particular turnable and/or bendable, relative to each other for changing the blade profile. Thereby, an effective profile changing equipment may be provided which may be easily adjustable and changeable.

According to an embodiment of the present invention, the setting of the blade profile changing equipment is representable by a relative angle of orientations of the first and the second portion of the flap.

Thereby, an especially simple construction of a profile changing equipment is provided which may easily be adjusted during the method.

According to an embodiment of the present invention, during a first time period, the wind speed varies around a first average wind speed (wind speed e.g. averaged over 1 s to 30 s) and the blade pitch is kept constant at a first blade pitch angle, wherein, during a second time period, the wind speed varies around a second average wind speed different from the first average wind speed and the blade pitch is kept constant at a second blade pitch angle different from the first blade pitch angle, wherein during the first time period and the second time period the blade profile is changed, in response to varying wind speed, for keeping the rotational speed of the rotor substantially constant.

The first average wind speed and/or the second average wind speed may be above or below a rated wind speed. In particular, the first and also the second average wind speed may be above the rated wind speed. Thereby, it may be avoided in the event of a wind speed change, the blade pitch angle change, thereby reducing loads on components of the pitch system. Only when a very rapid and extensive temporal change of the wind speed occurs may the blade profile be changed in combination with a change of the blade pitch angle.

It should be understood that features which have individually or in any combination been disclosed, described or provided for a method of controlling a rotational speed of a rotor of a wind turbine may also, individually or in any combination applied for or provided for an arrangement for controlling a rotational speed of a rotor of a wind turbine according to embodiments of the present invention and vice versa.

According to an embodiment of the present invention it is provided an arrangement for controlling a rotational speed of a rotor of a wind turbine, having a rotor with blades connected thereon, at least one blade including a blade profile changing equipment, the arrangement comprising a processor adapted to control changing the blade profile dependent on a rotational speed deviation of an actual rotational speed of the rotor or the generator from a reference rotational speed.

In particular, the processor may execute a program, in particular computer program including instructions to the processor. For example, the arrangement may be comprised in the wind turbine controller, as a software module, or as an application specific integrated circuit or a combination of hardware and software.

According to an embodiment of the present invention, the arrangement further comprises a blade profile changing equipment including an actuator communicatively coupled with the processor and being adapted to change the blade profile.

The actuator may comprise an electric motor, a hydraulic system, and/or a compressor or the like. The blade profile changing equipment may be refittable or retrofittable to an existing turbine blade which has in itself no profile changing capability. In other embodiments, the blade profile changing equipment is integrally formed with the blade, and may be not detachable from the blade. The blade profile changing equipment may be detachable or not detachable from the blade.

According to an embodiment of the present invention it is provided a wind turbine, comprising an arrangement for controlling a rotational speed of a rotor according to one of the above described embodiments, a rotor, and blades connected to the rotor, at least one blade including the blade profile changing equipment.

BRIEF DESCRIPTION

Some of the embodiments will be described in detail, with reference to the following figures, wherein like designations denote like members, wherein:

FIG. 1 schematically illustrates a wind turbine according to an embodiment of the present invention including an arrangement for controlling a rotational speed of a rotor according to an embodiment of the present invention;

FIG. 2 schematically illustrates a diagram of an arrangement for controlling a rotational speed of a rotor of a wind turbine according to an embodiment of the present invention which may for example be included in the wind turbine illustrated in FIG. 1;

Figure 5:
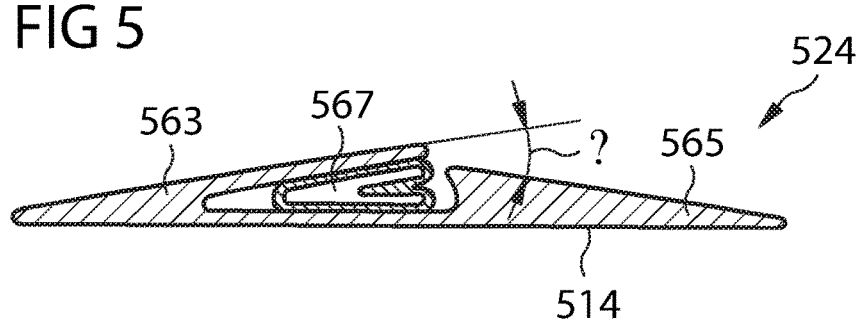
Figure 5:
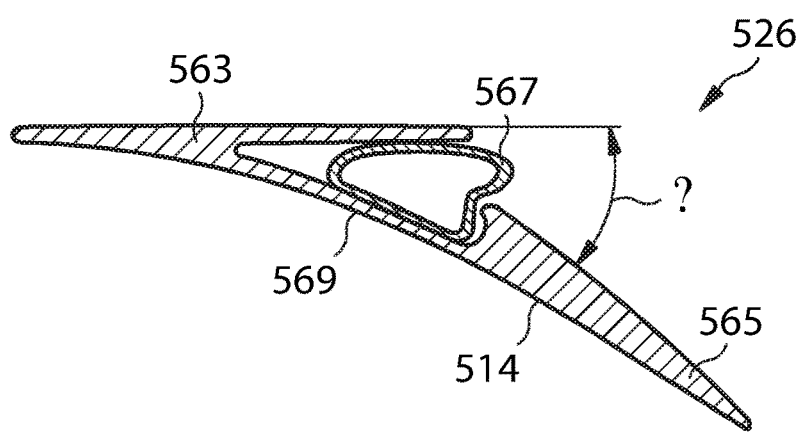
Figure 6:
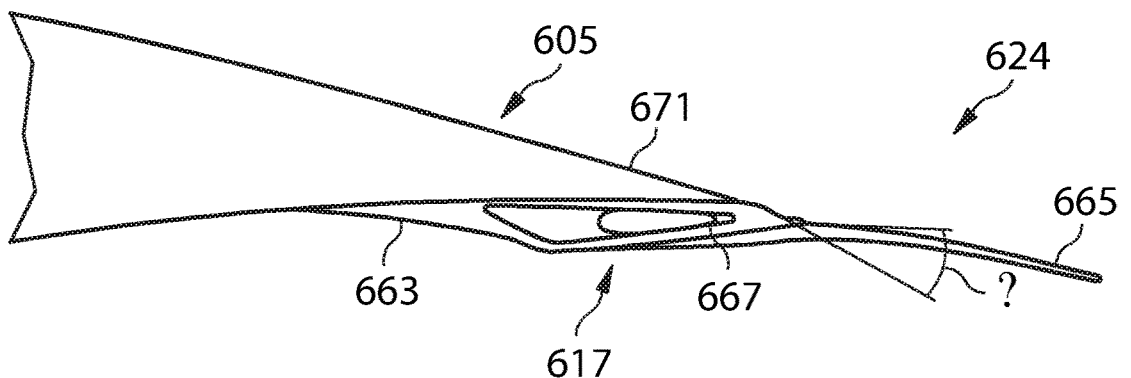
Figure 6:
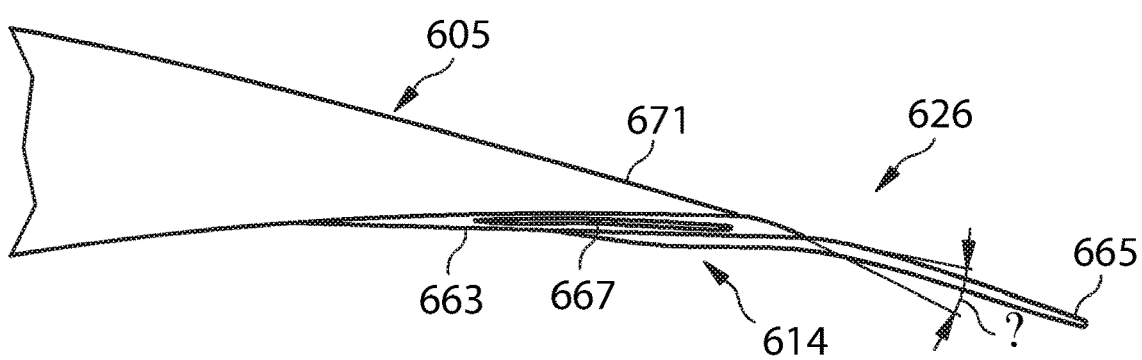
Figure 7:
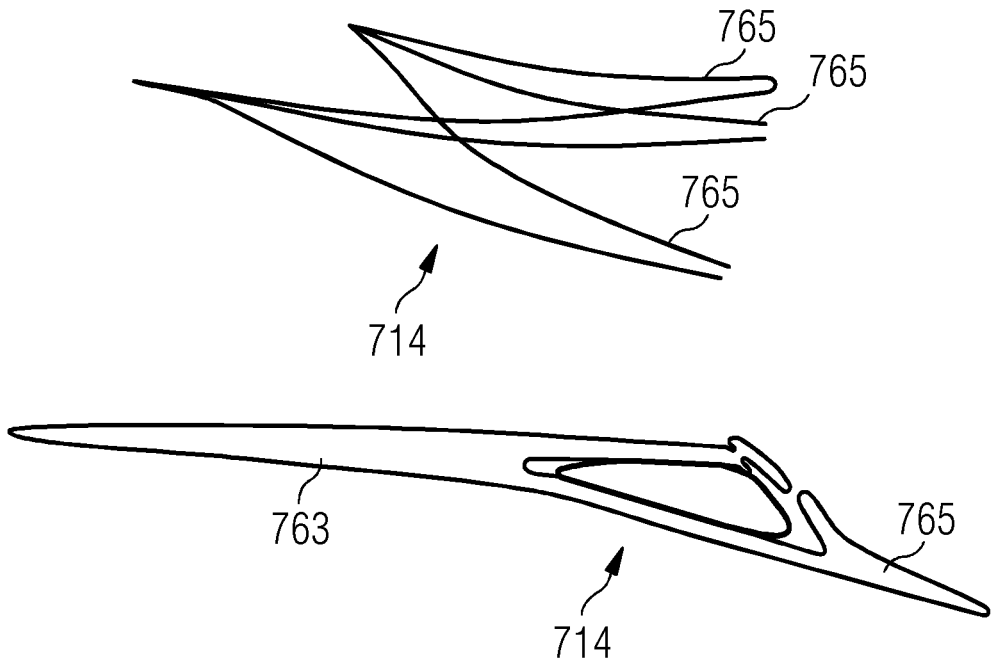
Figure 8:
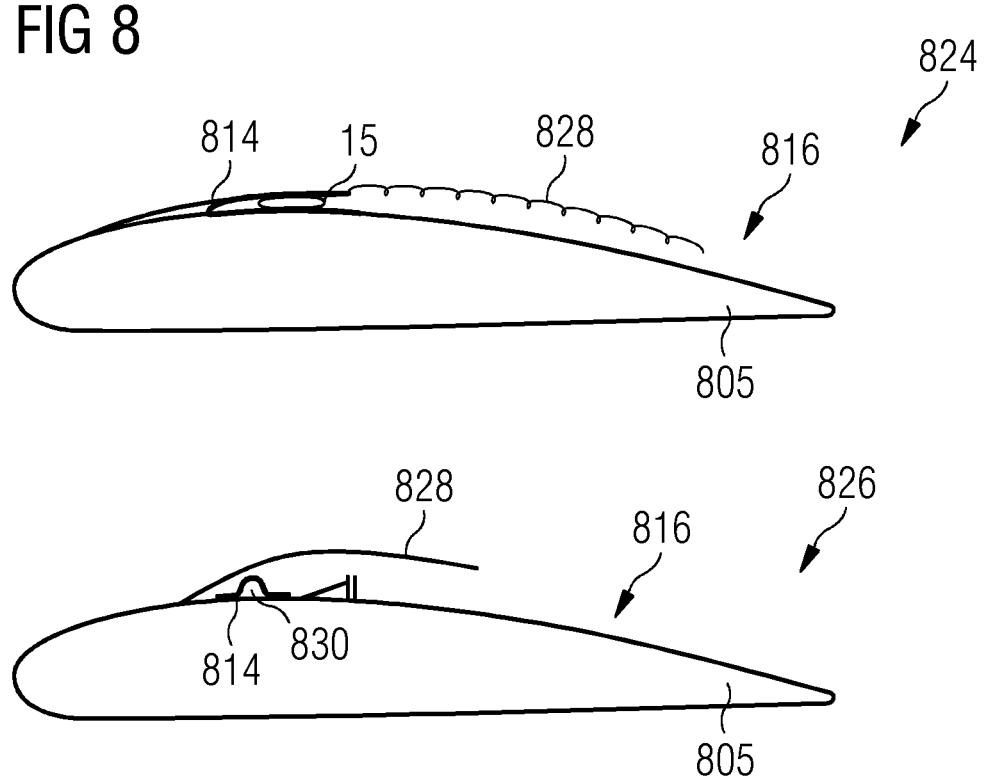
Figure 9:
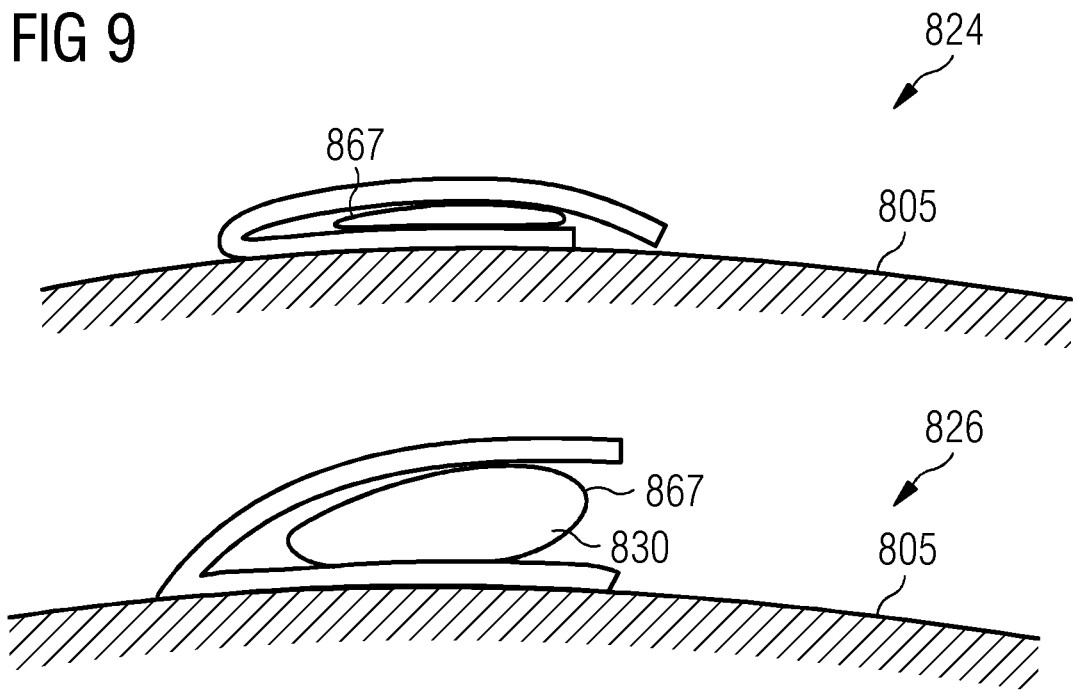
Figure 10:
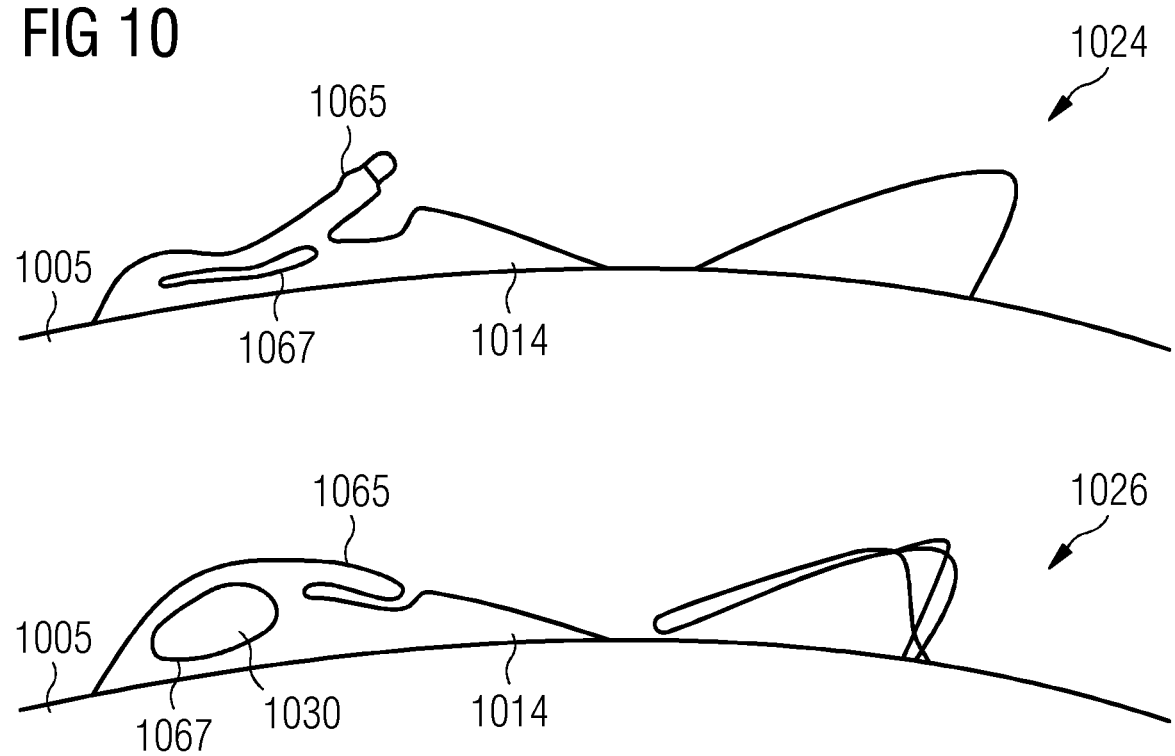

FIG. 5 schematically illustrates a first embodiment of a blade profile changing equipment according to embodiments of the present invention;

FIG. 6 schematically illustrates a second embodiment of a blade profile changing equipment according to embodiments of the present invention;

FIG. 7 schematically illustrates a third embodiment of a blade profile changing equipment according to embodiments of the present invention;

FIG. 8 schematically illustrates a fourth embodiment of a blade profile changing equipment according to embodiments of the present invention;

FIG. 9 schematically illustrates a fifth embodiment of a blade profile changing equipment according to embodiments of the present invention; and FIG. 10 schematically illustrates a sixth embodiment of a blade profile changing equipment according to embodiments of the present invention.

DETAILED DESCRIPTION

The illustration in the drawings is in schematic form. It is noted that in different figures, similar or identical elements are provided with the same reference signs or with reference signs, which are different from the corresponding reference signs only within the first digit.

Figure 1:
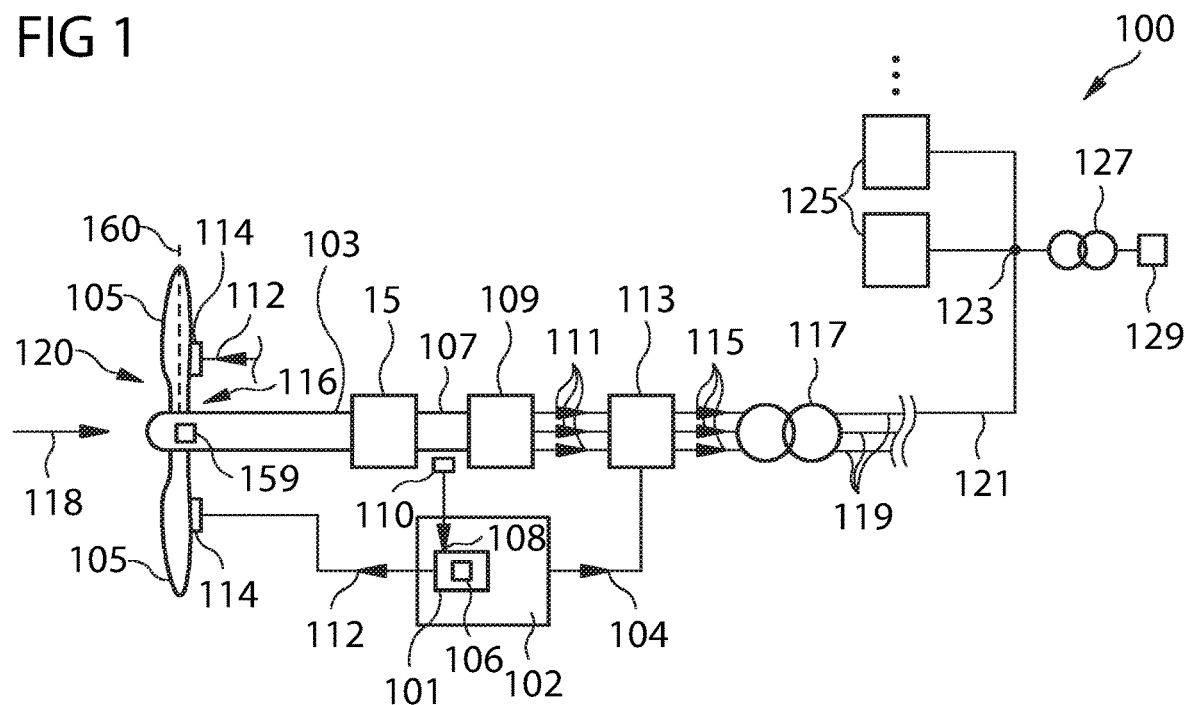

FIG. 1 schematically illustrates a wind turbine 100 according to an embodiment of the present invention including an arrangement 101 for controlling a rotational speed of a rotor 103 of the wind turbine 100. The wind turbine 100 comprises a rotor 103 at which plural rotor blades 105 are mounted. The wind turbine 100 further comprises an (optional) gearbox 15 which transmits the mechanical rotation of the (primary) shaft 103 to a secondary shaft (also called generator rotor) 107 which partly rotates (in particular having plural permanent magnets attached thereto) in a generator 109. The generator 109 outputs a (in particular three-phase) AC power stream 111 which is supplied to an AC-DC/DC-AC converter 113 which converts the variable frequency power stream 111 to a fixed frequency power stream 115 (in particular three-phase power stream) which is supplied to a wind turbine transformer 117 which transforms the output voltage of the converter to a higher voltage output at the output terminals 119. The wind turbine 100 is connected via a transmission line 121 to a point of common coupling 123 to which plural other wind turbines 125 are connected. The point of common coupling 123 is coupled to a park transformer 127 which provides a high output voltage such as several hundred kV which are transmitted to a utility grid 129

The wind turbine 100 comprises for control purposes a controller 102 which harbours in the illustrated embodiment the arrangement 101 for controlling the rotational speed of the rotor 103. In particular, the controller 101 controls, via control signals 104, the converter 113, wherein the control signals 104 may comprise a reference voltage, reference power, reference active power, reference reactive power or the like. The converter 113 may comprise in the AC-DC section as well as in the DC-AC section each for example six power transistors (for three phases) whose gates are driven by gate driver signals comprising pulse width modulation signals as derived from the reference signals 104 supplied to the converter 113.

The arrangement 101 comprises a processor 106 which is adapted to control changing the blade profile, i.e. the (in particular) aerodynamic profile of the blades 105 dependent on a rotational speed deviation of an actual rotational speed 108 of the rotor 107 (or the rotor 103) from a reference rotational speed which may for example be stored in a storage of the arrangement 101.

In particular, the actual rotational speed 108 of the secondary shaft 107 is measured using a rotational speed sensor 110 and supplied to the arrangement 101. The arrangement 101 outputs a control signal or drive signal 112 to the blade profile changing equipment 114 which is attached to or mounted to at least one of the rotor blades 105. For changing the blade profile, an actuator may be provided which may be adapted to move at least a portion of the blade profile changing equipment such as to change the aerodynamic profile of the rotor blade 105 in at least one portion thereof, in particular at a suction side 116 of the blade 105. The wind 118 impacts on the pressure side 120 of the rotor blade 105.

Figure 2:
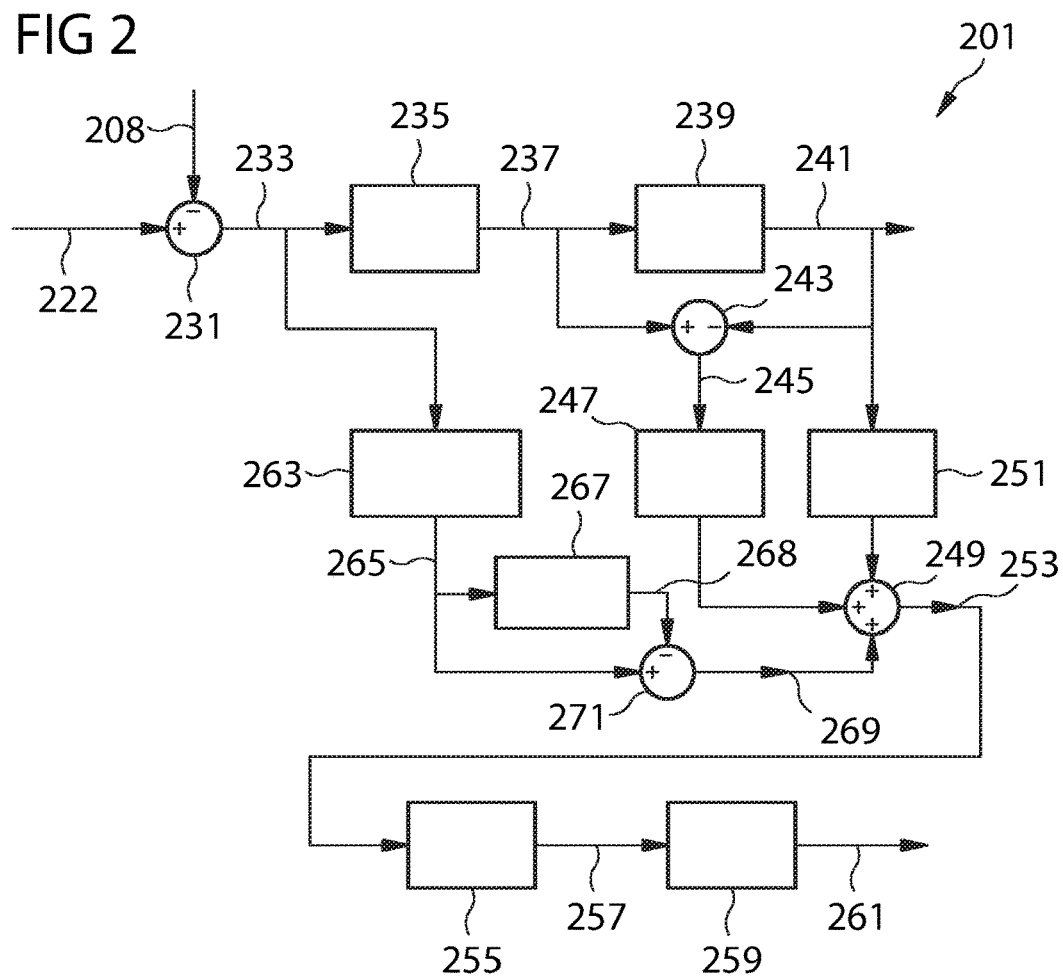

FIG. 2 schematically illustrates an embodiment of an arrangement 201 for controlling a rotational speed of a rotor of a wind turbine in more detail. The arrangement 201 receives the speed measurement signal 208 as well as a reference rotational speed 222 which are supplied to a subtraction element 231 which calculates a rotational speed deviation 233. The rotational speed deviation (also referred to as speed error) is supplied to a blade profile controller 235 (also referred to as flap controller or spoiler controller) which derives therefrom a blade profile reference signal 237. The blade profile reference 237 is supplied to a blade profile changing equipment 239 (for example a flap system or a spoiler adjustment system 114 illustrated in FIG. 1) which thereupon adjusts the blade profile to a particular setting 241 of the blade profile changing equipment. The adjusted setting 241 of the blade profile changing equipment leads to a particular torque or change in torque as effected by the wind impacting on the rotor blade and in turn causes a change in the rotational speed in order to diminish the rotational speed deviation 233.

In particular wind conditions, it may be sufficient for the wind turbine to control the rotational speed exclusively by adjusting the blade profile using the blade profile changing equipment 114, 239 without requiring to additionally adjust the pitch angle of the blades 105.

However, under other wind conditions, such as heavy, strong, or rapidly changing wind speed and/or direction, the control method may also involve adjusting the blade pitch angle as is explained below. For these further method steps, the arrangement 201 comprises a further subtraction element 243 which calculates from the actual (e.g. measured) setting 241 of the blade profile changing equipment and from the blade profile reference 237 a blade profile deviation 245 which is provided to a low pass filter 247. The low pass filter 247 dampens or diminishes high frequency variations of the blade profile deviation 245 and the low pass filtered blade profile deviation 245 is provided to an addition element 249.

To this addition element 249 also, according to embodiments of the present invention, is supplied a low pass filtered version of the setting 241 of the blade profile changing equipment, wherein for low pass filtering, the filter 251 may be used. Threshold frequencies and/or time constants of the filters 247, 251 may be selected or chosen according to the particular application, the constitution of the blade profile changing equipment and so forth.

The output of the addition element 249 represents a pitch controller input signal 253 which is supplied to a pitch controller 255 which derives based on the pitch controller input signal 253 a pitch reference 257. The pitch reference 257 is provided or supplied to a pitch system 259 which is illustrated in FIG. 1 and labelled with reference sign 159. The pitch system adjusts the pitch angle of the rotor blade by rotation about a longitudinal axis 160 of the rotor blade 105 (oriented in radial direction). Adjusting the pitch angle results in the actual pitch position 261 of the rotor blade which leads to a particular torque and in turn leads to a change in the rotational speed in a direction to diminish the rotational speed deviation 233.

For addressing rapid and drastic time changes of the rotational speed deviation, the arrangement 201 comprises further a feedforward filter 263 to which the rotational speed deviation 233 is supplied and which outputs a rotational speed deviation rate 265.

The rotational speed deviation rate 265 is supplied to a saturation block 267 which derives an output 268. When the rotational speed deviation rate 265 is below a threshold as stored in the saturation block 267, then the saturation block 267 outputs as an output signal 268 the rotational speed deviation rate 265. If, however, the rotational speed deviation rate 265 is greater than the threshold stored in the saturation module 267, the saturation module 267 outputs the threshold as the output signal 268.

The rotational speed deviation rate 265 and the output 268 are supplied to a further difference element 271 which outputs the excess 269 over the output 268 of the saturation element 267. An excess 269, if present, is output by the difference element 271 and supplied to the addition element 249.

Thereby, the pitch controller input signal 253 may be obtained as a sum of several signals addressing several conditions which may happen during execution of the control method.

Figure 3:
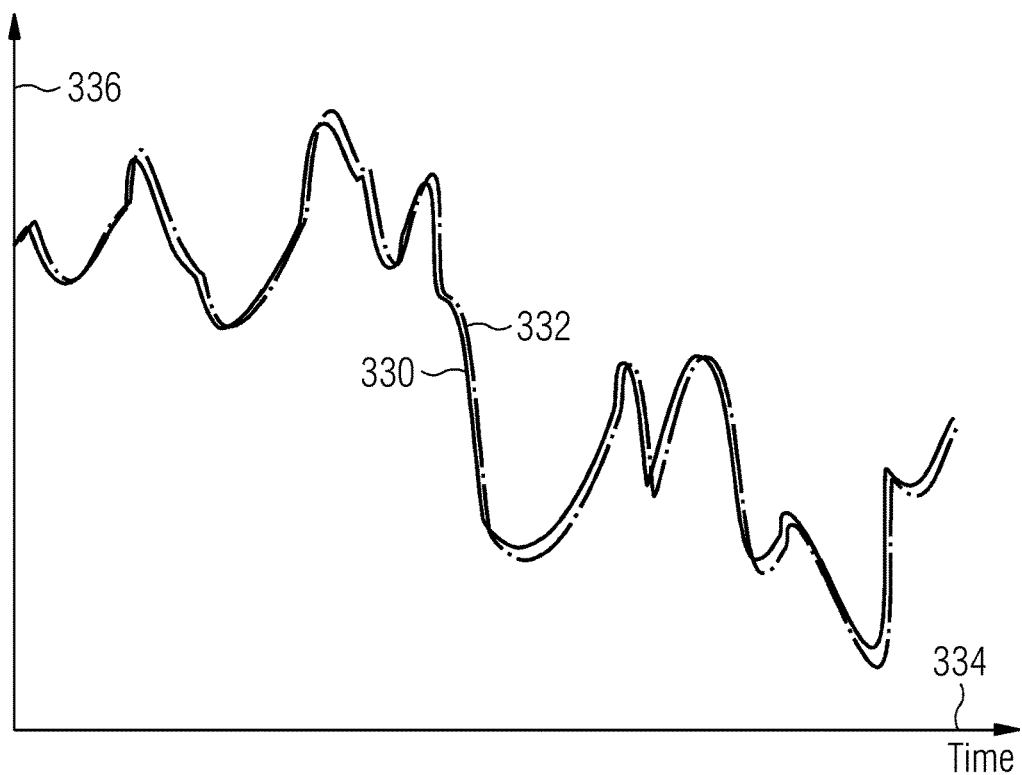
FIG. 3 illustrates a graph illustrating a pitch angle controller according to a conventional method.

FIG. 3 illustrates a graph showing a wind speed 330 and a pitch angle 332 in dependence of time 334 on the abscissa, wherein on the ordinate 336, the wind speed and the pitch angle, respectively, are indicated. As can be appreciated from FIG. 3, in case of changing wind speed 330, the pitch angle of the wind turbine is controlled according to pitch angle curve 332. Much of the pitch changing activity may, in the conventional system, happen to compensate for small variations in the wind speed.

Figure 4:
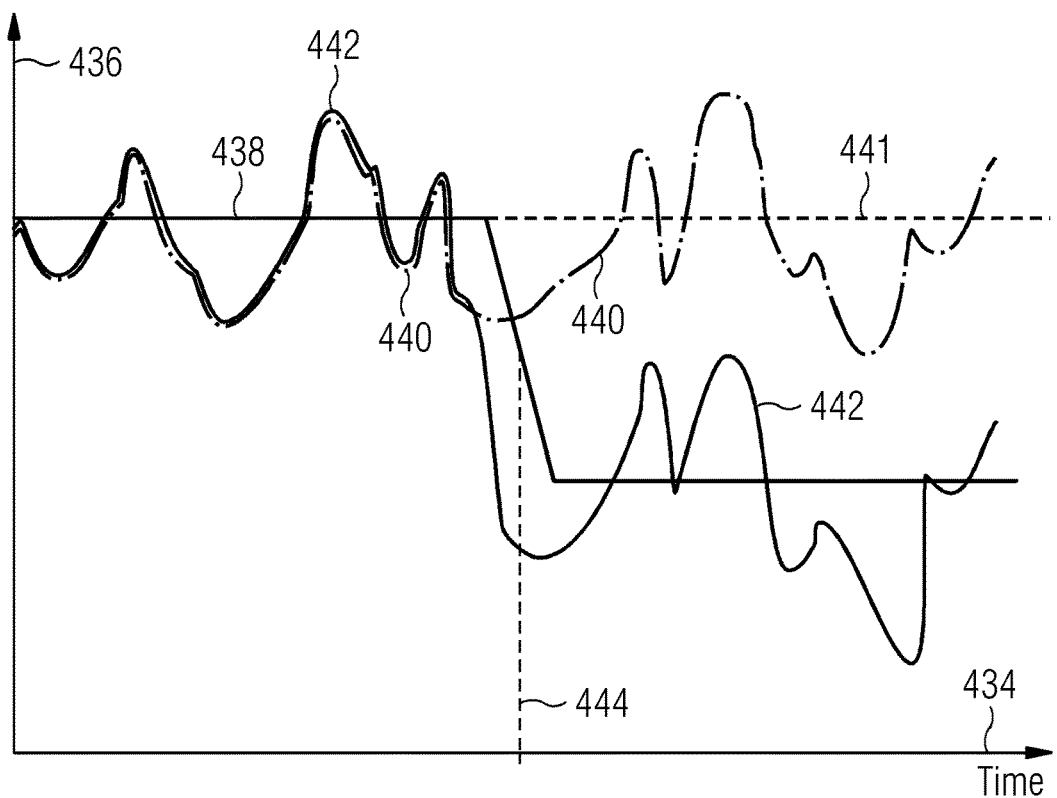
FIG. 4 illustrates a graph for explaining a combined adjusting of a blade profile changing equipment and a pitch angle according to an embodiment of the present invention, performed by the arrangement illustrated in FIG. 2.

These variations are, according to embodiments of the present invention, addressed by actively controlling a blade profile changing equipment, in particular flap and/or a spoiler mounted at the blades. This is illustrated in FIG. 4 which shows on an abscissa 434 the time and on an ordinate 436 the wind speed, the pitch angle and a setting of a blade profile changing equipment according to an embodiment of the present invention. In particular, the pitch angle is illustrated as a curve 438, the setting of the blade profile changing equipment is labelled with reference sign 440 and the wind speed is labelled with reference sign 442. In the graph illustrated in FIG. 4, in fact the setting 440 of the blade profile changing equipment is represented by a flap angle of a flap mounted at a (rear end of a) rotor blade. Controlling the flaps of the blade effectively changes the aerodynamic profile of the blade.

While the wind speed stays (on average) at a particular level, the pitch angle may be kept constant, i.e. no pitching is needed. This can be appreciated from FIG. 4 where the pitch angle stays at a first pitch angle while the wind speed 442 varies around a first wind speed average. When the wind speed 442 varies around a second wind speed average, the pitch angle is adjusted to a second pitch angle different from the first pitch angle. By diminishing the pitching, the blade bearing may not be worn out.

Whenever a large change in the wind speed happens as for example time point 444, the pitch controller 255 may pitch the blade into a new equilibrium position and the blade profile changing equipment (in particular the flaps) may once again handle all the small variations in the wind speed around this new equilibrium. The flap angle (curve 440) varies before and after the change of the wind speed at time point 444 in about a same extent around a mean value 441.

As an advantage of the control method according to embodiments of the present invention, a large reduction in the traveled distance of the blade bearings due to small variations in the wind speed may be achieved.

Conventionally, for all small variations in the wind speed, pitching is performed, leading to wear out of the pitch bearings. The reduction in traveled blade bearing distance according to embodiments of the invention may mean less wear on the bearings and less blade bearing warranty cases, exchanges, longer service intervals, etc.

Under the term "blade profile" it is also understood to adjust a drag, for example established by an adjustable spoiler. Thus, instead of using one or more flaps on the rotor blade, one or more spoilers on the suction surface of the rotor blade may be utilized, to change the blade profile. This has been conventionally also referred to as drag. There may be various ways to increase or decrease the drag of the rotor blade. One is to use a spoiler, another is to generate stall which may both reduce lift and increase drag. One advantage of using drag to control power is that drag goes almost directly to rotor torque and hence power.

In the FIGS. 5 to 10, different configurations of blade profile changing equipment are illustrated, according to embodiments of the present invention.

FIG. 5 schematically illustrates an embodiment of a blade profile changing equipment 514 here embodied as a movable trailing edge arrangement. In the attachment region (also referred to as first portion) 563, the equipment 514 may be attached to a trailing edge section of a rotor blade 105. The equipment 514 further comprises an aerodynamic changing portion (also referred to as second portion) 565 which is shaped as a flap. The aerodynamic portion 565 of the movable trailing edge arrangement 514 is detachably connected with the remaining part of the equipment 514. The equipment 514 comprises an inflatable and deflatable hose or bag 567 which can for example be inflated by providing compressed air or fluid into an inside of the hose 567.

The deflated state is illustrated in the view 524 and the inflated configuration is illustrated in the view 526 of FIG. 5. Upon inflation of the hose 567, the portions 563 and 565 change their relative orientation and a region between the regions 563 and 565 comprises a bent portion 569. The angle α between upper surfaces of the portions 563 and 565 may for example characterize a setting of the blade profile changing equipment 514.

FIG. 6 illustrates schematically another embodiment of a flap 614 as mounted on a rear end portion 671 of a blade 605. In the view 624, a flexible hose or bag 667 is inflated causing a rear end portion 665 of the flap 614 to turn upwards. In the non-inflated situation illustrated in view 626, the rear end portion 665 of the flap 614 is turned downwards relative to the view 624, thereby changing the blade profile.

FIG. 7 illustrates different orientations of flaps 714 having rear end portions 765. The change of the orientation of the rear end portions 765 may be effected by filling a liquid or compressed air into a cavity or a hose or actuating an electric motor, for example, or using a hydraulic system.

FIGS. 8 and 9 illustrate in an overview (FIG. 8) and in a detailed view (FIG. 9) a spoiler 814 as another example of a blade profile changing equipment according to embodiments of the present invention. Thereby, the view 824 illustrates the spoiler in a non-inflated configuration, while the view 826 illustrates the spoiler 814 in an inflated configuration. Wind trajectories 828 are depicted illustrating an enhanced drag effect, when the spoiler 814 is in the inflated configuration as illustrated in the view 826.

FIG. 10 schematically illustrates another example of a blade profile changing equipment 1014 in a deflated configuration in view 1024 and in an inflated configuration in view 1026. The equipment 1014 comprises a cavity 1030 which may be filled with a fluid, in particular compressed air, to switch from the deflated configuration illustrated in view 1024 to the inflated configuration illustrated in view 1026. Upon inflation of the cavity 1030, a connected portion 1065 changes its orientation from an extended or protruding configuration in view 1024 to a buried or hidden configuration in view 1026, thereby changing the blade profile.

Other configurations of the blade profile changing equipment are possible.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method of controlling a rotational speed of a rotor of a wind turbine having a rotor with a plurality of blades connected thereon, at least one blade of the plurality of blades including a blade profile changing equipment including a flap and/or a spoiler, the method comprising:

changing a blade profile dependent on a rotational speed deviation of an actual rotational speed of the rotor or the generator rotor from a reference rotational speed, wherein changing the blade profile comprises: deriving, using a blade profile controller, a blade profile reference based on the rotational speed deviation, and adjusting the blade profile, using an actuator, based on the blade profile reference;

determining a setting of the blade profile changing equipment;

deriving a blade profile deviation of the blade profile reference, wherein the blade profile deviation is derived based on the difference between the determined setting of the blade profile changing equipment and the blade profile reference;

supplying a pitch controller input signal to a pitch controller, wherein the pitch controller input signal is based on a plurality of signals addressing a plurality of conditions occurring during the method, the plurality of conditions including at least average wind speed changes, and rapid time changes of rotational speed deviation, wherein the pitch controller input signal is the sum of a plurality of signals, the plurality of signals comprising:

a low pass filtering of the blade profile deviation;

a low pass filtering of the determined setting of the blade profile changing equipment;

and a rate excess of a rotational speed deviation rate, wherein the rotational speed deviation rate is a time change of the rotational speed deviation and the rate excess of the rotational speed deviation rate is the amount the rotational speed deviation rate is over a threshold rate;

deriving, using the pitch controller, a pitch reference based on the pitch controller input signal; and, adjusting a pitch position of the at least one blade based on the pitch reference.

2. The method according to claim 1, wherein the rate excess of the rotational speed deviation rate is determined by comparing the rotational speed deviation rate to the threshold rate such that:

if the rotational speed deviation rate is less than the threshold rate, the value of rotational speed deviation rate is used to determine the rate excess such that rate excess will be zero, if the rotational speed deviation rate is greater than the threshold rate, the threshold rate is used to determine the rate excess such that the rate excess is the difference between the rotational speed deviation rate and the threshold rate.

3. The method according to claim 1, wherein the blade profile changing equipment is mounted at the at least one blade such as to change at least a portion of a surface shape at a suction side of the at least one blade.

4. The method according to claim 1, wherein the blade profile changing equipment comprises an adjustable spoiler, mounted on a suction surface of the at least one blade, the adjustable spoiler being adjustable by supplying a fluid into or withdrawing a fluid out of a cavity or hose thereby adjusting an extent of protrusion of the adjustable spoiler from a surrounding suction surface of the at least one blade.

5. The method according to claim 1, wherein the blade profile changing equipment comprises a flap mounted at the at least one blade, at a rear edge of the at least one blade, the flap extending and defining a rear end portion of a suction side surface.

6. The method according to claim 5, wherein the flap comprises at least a first portion and a second portion which are turnable, relative to each other for changing the blade profile.

7. The method according to claim 5, wherein the setting of the blade profile changing equipment is represented by a relative angle of orientation of the first portion and the second portion of the flap.

8. The method according to claim 1, wherein, during a first time period, a wind speed varies around a first average wind speed and the blade pitch is kept constant at a first blade pitch angle, and, during a second time period, the wind speed varies around a second average wind speed different from the first average wind speed and the blade pitch is kept constant at a second blade pitch angle different from the first blade pitch angle, further wherein during the first time period and the second time period the blade profile is changed, in response to varying wind speed, for keeping the rotational speed of the rotor substantially constant.

9. A system for controlling a rotational speed of a rotor of a wind turbine, having a rotor with a plurality of blades connected thereon, at least one blade including a blade profile changing equipment including a flap and/or a spoiler, the arrangement comprising:
 a processor configured to control changing the blade profile dependent on a rotational speed deviation of an actual rotational speed of the rotor or the generator rotor from a reference rotational speed, wherein changing the blade profile comprises:
  deriving, using a blade profile controller, a blade profile reference based on the rotational speed deviation, and adjusting the blade profile, using an actuator, based on the blade profile reference;
  wherein the processor k further configured to:
   determine a setting of the blade profile changing equipment;
   derive a blade profile deviation of the blade profile reference, wherein the blade profile deviation is derived based on the difference between the determined setting of the blade profile changing equipment and the blade profile reference;
  supply a pitch controller input signal to a pitch controller, wherein the pitch controller input signal is based on a plurality of signals addressing a plurality of conditions, the plurality of conditions including at least average wind speed changes and rapid time changes of rotational speed deviation, wherein the pitch controller input signal is the sum of a plurality of signals, the plurality of signals comprising:
   a low pass filtering of the blade profile deviation;
   a low pass filtering of the determined setting of the blade profile changing equipment;
   and a rate excess of a rotational speed deviation rate, wherein the rotational speed deviation rate k a time change of the rotational speed deviation and the rate excess of the rotational speed deviation rate k the amount the rotational speed deviation rate k over a threshold rate;
  derive, using the pitch controller, a pitch reference based on the pitch controller input signal;
 and adjust a pitch position of the at least one blade based on the pitch reference.

10. The system according to claim 9, wherein the blade profile changing equipment includes an actuator communicatively coupled with the processor and being configured to change the blade profile.

11. A wind turbine, comprising:
 a system according to claim 10;
 a rotor;
 and a plurality of blades connected to the rotor, at least one blade including the blade profile changing equipment.

* * * * *

UNITED STATES PATENT AND TRADEMARK OFFICE
CERTIFICATE OF CORRECTION

PATENT NO. : 10,570,881 B2
APPLICATION NO. : 15/683802
DATED : February 25, 2020
INVENTOR(S) : Per Egedal et al.

Page 1 of 1

It is certified that error appears in the above-identified patent and that said Letters Patent is hereby corrected as shown below:

In the Claims

Column 14, Lines 19-20, Claim 9 delete "deviation rate k a" and insert -- deviation rate is a --

Column 14, Line 22, Claim 9 delete "deviation rate k the" and insert -- deviation rate is the --

Column 14, Line 23, Claim 9 delete "deviation rate k over" and insert -- deviation rate is over --

Signed and Sealed this
Sixteenth Day of June, 2020

Andrei Iancu
*Director of the United States Patent and Trademark Office*